United States Patent
Huang et al.

(10) Patent No.: US 10,838,246 B2
(45) Date of Patent: Nov. 17, 2020

(54) FORCE-SENSITIVE DISPLAY ASSEMBLY FOR USER INPUT

(71) Applicant: Intel Corporation, Santa Clara, CA (US)

(72) Inventors: Mingjing Huang, San Francisco, CA (US); Jacob E. Ben-Poorat, Oakland, CA (US); Jane Hong, Lynnwood, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/280,336

(22) Filed: Sep. 29, 2016

(65) Prior Publication Data

US 2018/0088719 A1    Mar. 29, 2018

(51) Int. Cl.
G02F 1/1333    (2006.01)
G06F 3/041    (2006.01)

(52) U.S. Cl.
CPC .......... G02F 1/13338 (2013.01); G06F 3/041 (2013.01); *G06F 2203/04104* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 7,772,960 B2 | 8/2010 | Baker | |
| 8,780,543 B2 | 7/2014 | Molne et al. | |
| 8,994,648 B2 * | 3/2015 | Lamb | G06F 3/0414 345/156 |
| 9,035,752 B2 * | 5/2015 | Rosenberg | G06F 1/1684 340/407.2 |
| 9,195,343 B1 * | 11/2015 | Zarraga | G01L 1/2287 |
| 9,280,208 B2 * | 3/2016 | Grandemange | G06F 3/0202 |
| 9,354,731 B1 * | 5/2016 | Pance | G06F 3/0488 |
| 9,619,084 B2 * | 4/2017 | Deichmann | G06F 3/0421 |
| 9,664,577 B1 * | 5/2017 | Liljegren | G01L 1/2287 |
| 2012/0013272 A1 * | 1/2012 | Huang | G06F 3/0202 315/312 |
| 2012/0200789 A1 * | 8/2012 | Molne | G06F 3/0414 349/12 |
| 2016/0092015 A1 | 3/2016 | Al-Dahle et al. | |

OTHER PUBLICATIONS

Miyaki, Takashi, et al., "GraspZoom: zooming and scrolling control model for single-handed mobile interaction", *Proceedincs of the 11th International Conference on Human-Computer Interaction with Mobile Devices and Services, MobileHCI '09*, Sep. 15-18, 2009, Bonn, Germany, (2009), 4 pgs.

* cited by examiner

*Primary Examiner* — Andre L Matthews
(74) *Attorney, Agent, or Firm* — Schwegman Lundberg & Woessner, P.A.

(57) ABSTRACT

A force-sensitive display assembly provides a user input that is reliable, consumes a relatively small amount of power, and protects against water, dust, and other environmental ingress. The force-sensitive display may be implemented using a force-sensing substrate, such as a force-sensing resistor (FSR). The FSR provides a change in output resistance in response to a change in pressure applied to the FSR. In an embodiment, the FSR enables detection of a tap input on a display.

16 Claims, 4 Drawing Sheets to
FORCE-SENSITIVE DISPLAY ASSEMBLY FOR USER INPUT

TECHNICAL FIELD

Embodiments described herein generally relate to portable electronic device user input assemblies.

BACKGROUND

There is an increasing demand for interactive electronic devices, including portable or wearable electronic devices. As portable electronic devices become smaller, the amount of space available for user inputs for these devices is also reduced. Some existing solutions for a user input for a portable electronic device include a button, a rotating disc, a touchscreen, or other user input. However, the reduced size of portable electronic device user inputs increases the difficulty of providing sealing against water, dust, or other environmental ingress. It is desirable to provide an improved user input for portable electronic devices.

DESCRIPTION OF EMBODIMENTS

A technical problem faced by portable electronic devices is providing a user input that is reliable, consumes a relatively small amount of power, and protects against water, dust, and other environmental ingress. As described herein, a force-sensitive display assembly provides technical solutions to these technical problems. The force-sensitive display may be implemented using a force-sensing substrate, such as a force-sensing resistor (FSR). The FSR provides a change in output resistance in response to a change in pressure applied to the FSR. In an embodiment, the FSR enables detection of a tap input on a display.

The following description and the drawings sufficiently illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
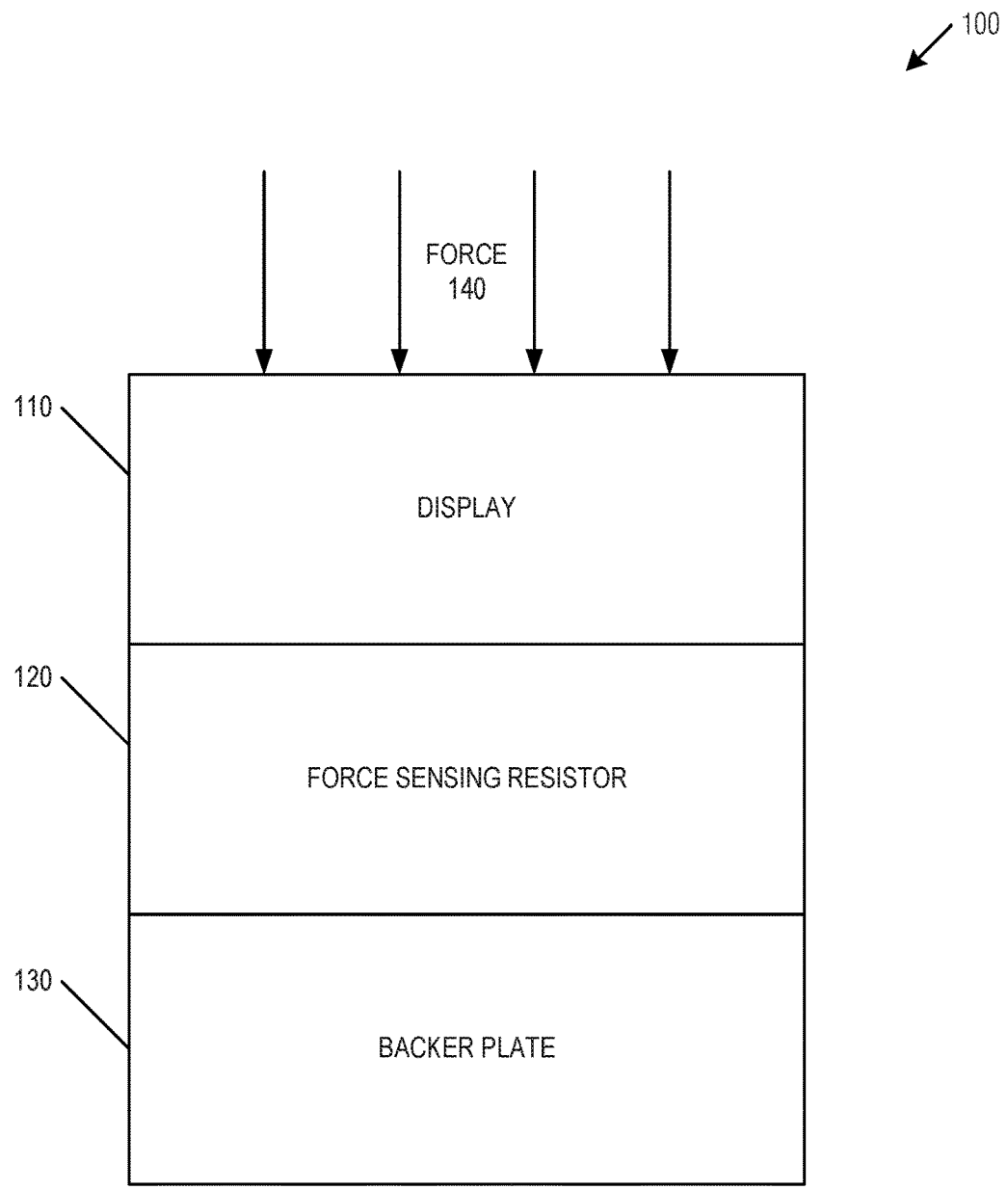
FIG. 1 is a block diagram of a first FSR display assembly, in accordance with at least one embodiment of the invention.

FIG. 1 is a block diagram of a first FSR display assembly 100, in accordance with at least one embodiment of the invention. First assembly 100 includes a display 110. The display 110 may include a single component that provides a user-readable display and a protective layer, such as a liquid crystal display (LCD). The display 110 may include multiple components, such as a user-readable organic light emitting diode (OLED) protected by a transparent or translucent layer, such as glass or clear polycarbonate. The display 110 is disposed on an FSR 120, and the combination of the display 110 and FSR 120 are disposed on a backer plate 130. When a force 140 is applied to the display 110, the display 110 compresses the FSR 120 against the backer plate 130. This compression of the FSR 120 changes the resistance of the FSR 120, which may be detected by the electronic device that is housing the first FSR display assembly 100. Multiple FSR sensors may be used to detect a user input on a specific portion of the display 110, may be used to detect two or more simultaneous inputs (e.g. two-finger tap), or may be used to detect a user input gesture movement on display 110 (e.g., swipe, pinch, rotate, flick, or other user input gesture).

Figure 2:
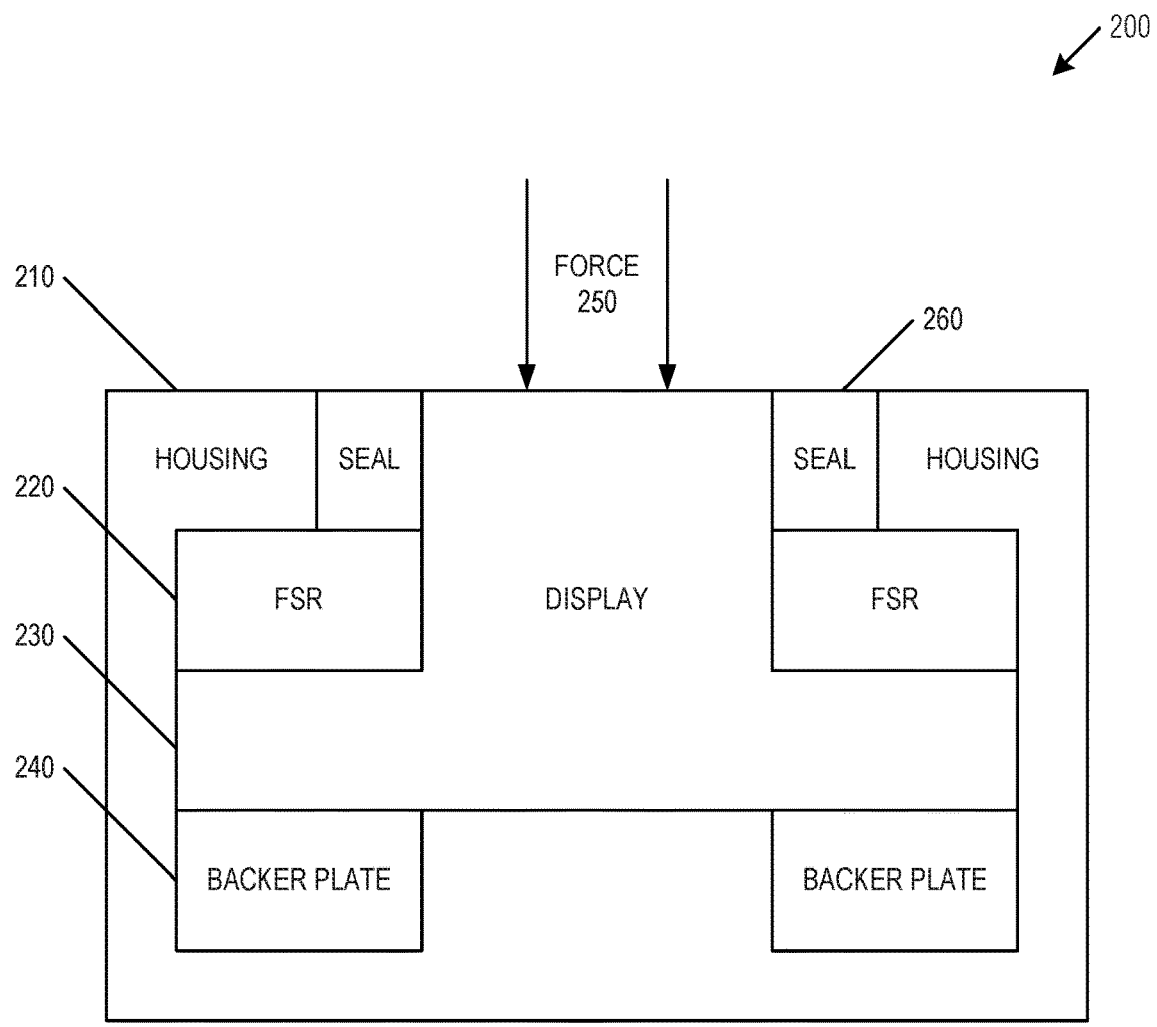
FIG. 2 is a block diagram of a second FSR display assembly, in accordance with at least one embodiment of the invention.

FIG. 2 is a block diagram of a second FSR display assembly 200, in accordance with at least one embodiment of the invention. Second assembly 200 includes a housing 210, such as a device case (e.g., device chassis). Within the housing 210 is at least one FSR 220 disposed on a display 230, where the display 230 is disposed on a stiff backer plate 240. The combination of the housing 210, FSR 220, display 230, and backer plate 240 are configured to provide a steady state compressive force to the FSR 220. Using this configuration, when a user applies a force 250 to the display 230, the compression experienced by the FSR 220 is reduced and the FSR 220 changes resistance in response to the change in pressure. Multiple FSR sensors may be used to detect a user input on a specific portion of the display 230, may be used to detect two or more simultaneous inputs (e.g. two-finger tap), or may be used to detect a user input gesture movement on display 230 (e.g., swipe, pinch, rotate, flick, or other user input gesture). A seal 260 may also be provided to seal against environmental ingress, to provide additional compression to the FSR 220, or to provide a restorative force on the display 230. For example, after the user applies and removes a force 250 on the display 230, the seal 260 may apply a restorative force to pull the display 230 back into its previous position, and to return the compression and resistance output of the FSR 220 to known values. In an embodiment, the sealed configuration provides a water resistance rating of at least 5 ATM.

To detect an input event (e.g., interrupt), the FSR 220 resistance may be monitored to detect a user applying a force 250 to the display 230. The change in resistance may be compared against a known resistance value of the FSR 220, and an input event (e.g., interrupt) may be triggered when the difference exceeds a resistance difference threshold. In an embodiment, the FSR 220 is connected to a resistance-based voltage divider, where a change in the resistance of the FSR 220 results in a substantially proportional change in voltage, which may also be compared against a voltage difference threshold. Various embodiments may use other threshold comparisons, such as a current or inductance threshold comparison. The thresholds may be static, and may be stored within hardware, software, or firmware. The thresholds may be dynamically adjusted, such as based on detected steady-state values of the FSR 220, or based on the magnitude of detected changes in the output values of the FSR 220.

The force 250 may be applied as a tap input, a sustained pressure (e.g., at least 500 milliseconds), or a sequence of any combination of tap or sustained pressure inputs. The output of the FSR 220 may be sampled at a selected sampling frequency. The sampling frequency may be static or dynamically adjusted based on device state or previous input. For example, a lower sampling frequency may be used while the device is in a low power mode, and a higher frequency may be used in a higher power mode, such as in response to detection of a user input. As an alternative to sampling the output of the FSR 220, the output may be configured to trigger a hardware interrupt. For example, a hardware interrupt may be triggered when the voltage level provided by the second assembly 200 rises above a hardware voltage trigger level.

The second assembly 200 provides various advantages over other electronic device user inputs. Some portable electronic device user inputs include a mechanical movement for input, such as a button or rotating disc. However, these mechanical input devices often require physical space within the electronic device chassis to accommodate the movement, such as the housing (e.g. button receptacle) and travel distance (e.g. button receptacle depth) required for a pushbutton, a dome lens button, or a dome switch. Mechanical input devices also increase the number of openings in a device chassis, and each additional opening further reduces the ability to protect against water, dust, and other environmental ingress. The FSR 220 may be formed into a sheet or other substantially planar configuration, which does not require the same housing or travel distance as an input button or disc. The FSR 220 may be positioned within the housing 210, where the second assembly 200 avoids the openings for environmental ingress used by a mechanical input button or disc.

The second assembly 200 also provides various advantages over non-mechanical user inputs. Some portable electronic device user inputs do not require a mechanical movement, and may instead use a capacitive touchscreen, a resistive touchscreen, or device chassis accelerometer input sensor. However, these non-mechanical inputs often require higher power to enable input detection at any time the device is powered. For example, accelerometer input sensors require continuous sampling and analysis of the accelerometer data to distinguish user inputs from device movement. In contrast, the second assembly 200 may be configured to function as a hardware interrupt, enabling the device to operate in a low power mode, where application of pressure causes the device to change modes (e.g., "wake up") or respond to the user input. In some embodiments, the low-power mode enables an average power consumption of the electronic device of less than a microwatt of power. Similarly, when contrasted with capacitive sensors (e.g., using indium tin oxide (ITO) sensors) or resistive sensors, the second assembly 200 also exhibits improved reliability, increased resistance to electromagnetic interference (EMI), and lower overall cost.

Figure 3:
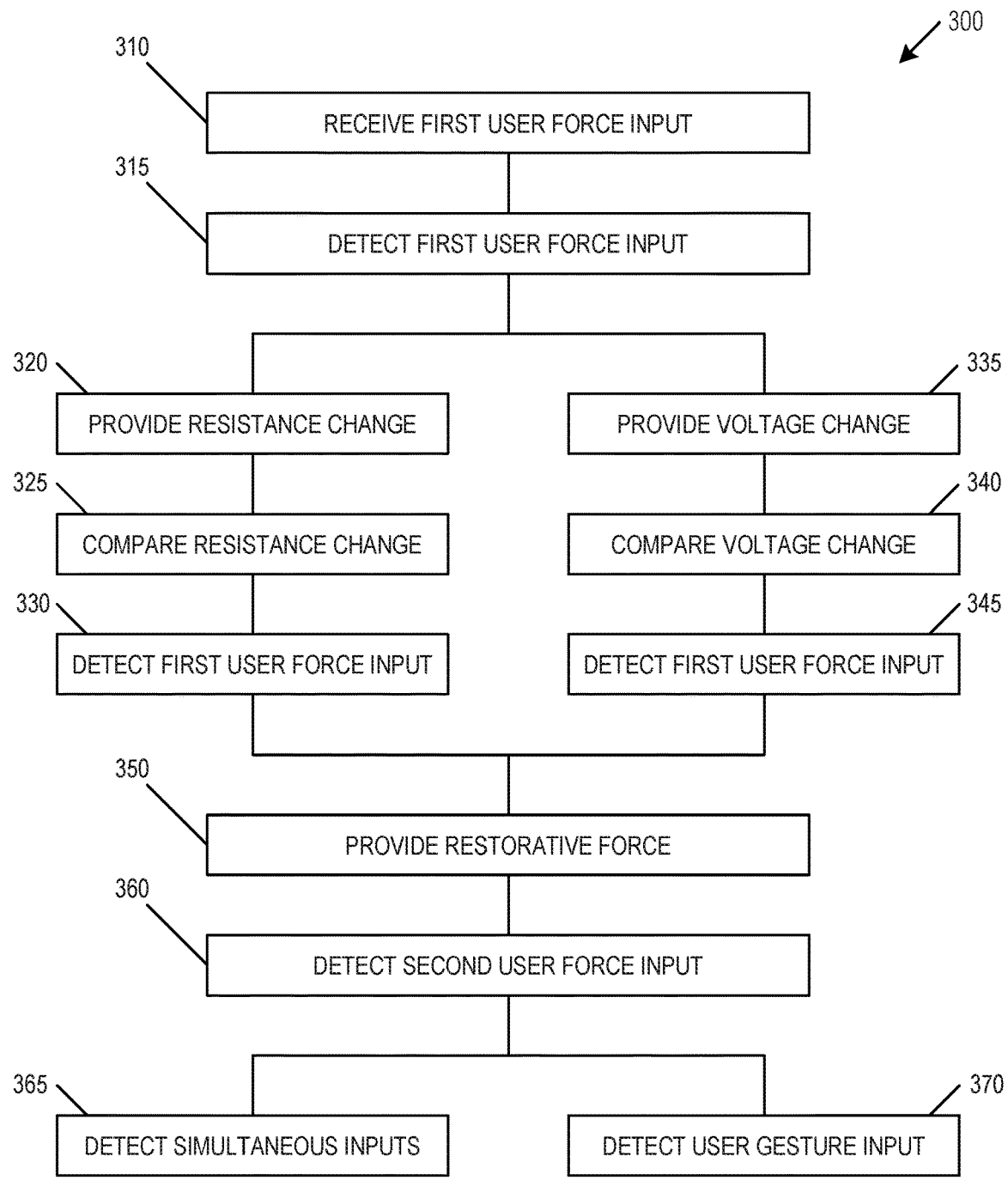
FIG. 3 is a block diagram illustrating method for detecting and applying an FSR input, in accordance with at least one embodiment of the invention.

FIG. 3 is a block diagram illustrating method 300 for detecting and applying an FSR input, in accordance with at least one embodiment of the invention. Method 300 includes receiving 310 a first user force input, such as an input applied to an electronic device display. Method 300 includes detecting 315 the first user force input. The detection is based on a first force-sensing output of a first force-sensing substrate. The first force-sensing substrate may be disposed between a housing and at least a first portion of a display, such as shown in FIG. 2.

The first force-sensing substrate may include a force-sensing resistor (FSR), the FSR providing 320 a resistance change in response to a compressive force change. The display and the housing exert a compressive force on the first force-sensing substrate, and the first user force input reduces the compressive force on the first force-sensing substrate. The FSR provides 320 the resistance change in response to a reduction or increase in the compressive force. Method 300 may include comparing 325 the resistance change against a resistance change threshold, and detecting 330 the first user force input when the resistance change exceeds the resistance change threshold.

Method 300 may include providing 335 a voltage change from a resistance-based voltage divider in response to the resistance change provided by the FSR. Method 300 may include comparing 340 the voltage change against a voltage change threshold, and detecting 345 the first user force input when the voltage change exceeds the voltage change threshold. The voltage change threshold may be static, or may be dynamically adjusted based on a detected voltage divider steady-state voltage.

Method 300 may include providing 350 a restorative force to return the display to a steady-state position. The restorative force returns the compressive force on the first force-sensing substrate to a steady-state restorative force. The restorative force may be provided by a seal disposed between the housing and a second portion of the display, such as shown in FIG. 2. The seal also reduces environmental ingress. In an embodiment, the seal provides a water resistance rating of at least 5 ATM.

Method 300 may include detecting 360 a second user force input. The second user force input may be based on a second force-sensing output of a second force-sensing substrate. The second force-sensing substrate disposed on at least a third portion of the display, such as shown in FIG. 2. Method 300 may include detecting 365 a plurality of simultaneous inputs based on the first user force input and second user force input. Method 300 may include detecting 370 a user gesture input applied to the display based on the first and second force-sensing substrates. In various examples, the gesture input may include a swipe, pinch, rotate, or flick gesture.

Figure 4:
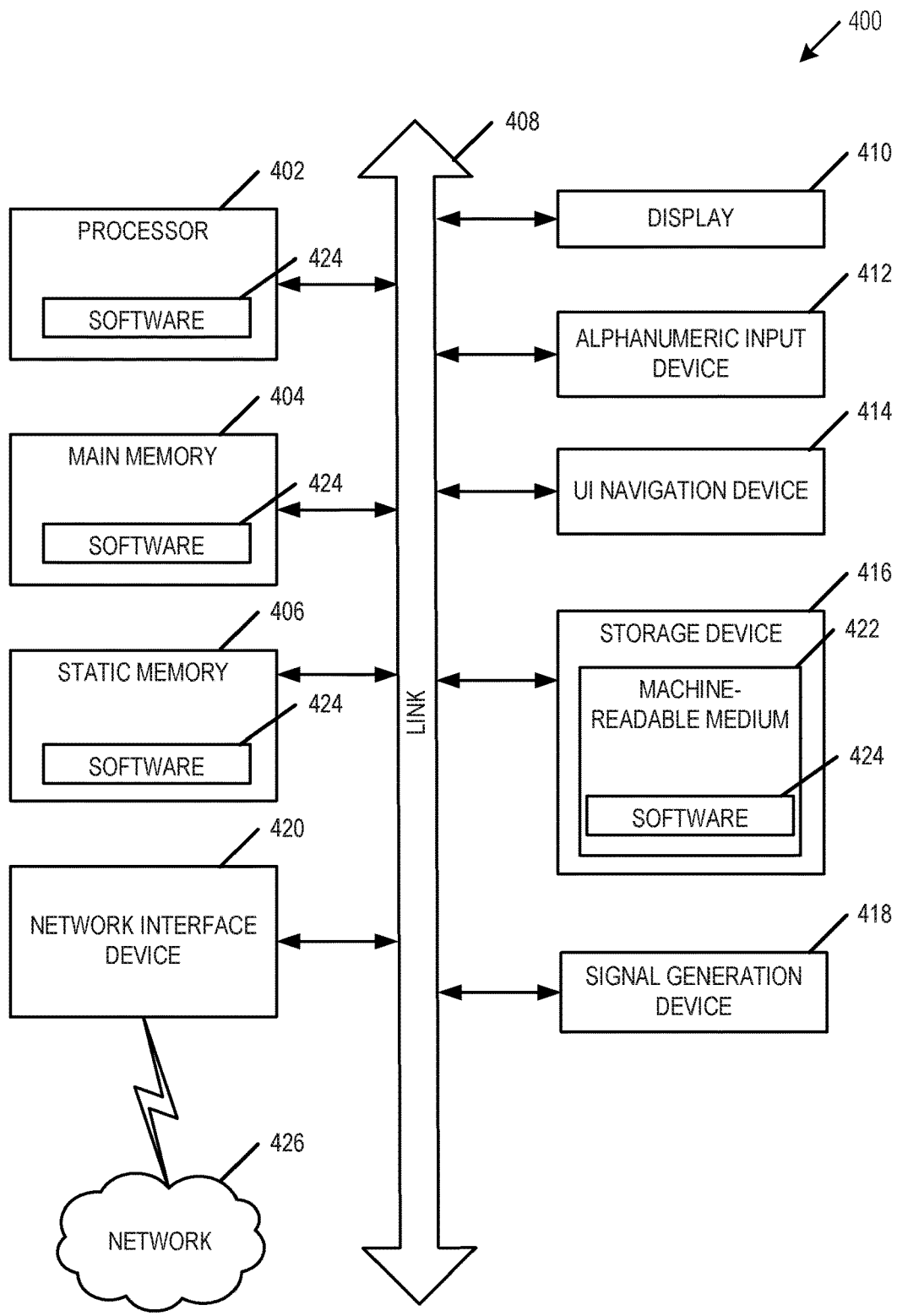
FIG. 4 is a block diagram illustrating a FSR electronic device in the example form of an electronic device, according to an example embodiment.

FIG. 4 is a block diagram illustrating a FSR electronic device in the example form of an electronic device 400, within which a set or sequence of instructions may be executed to cause the machine to perform any one of the methodologies discussed herein, according to an example embodiment. Electronic device 400 may also represent the devices shown in FIGS. 1-2. In alternative embodiments, the electronic device 400 operates as a standalone device or may be connected (e.g., networked) to other machines. In a networked deployment, the electronic device 400 may operate in the capacity of either a server or a client machine in server-client network environments, or it may act as a peer machine in peer-to-peer (or distributed) network environments. The electronic device 400 may be an integrated circuit (IC), a portable electronic device, a personal computer (PC), a tablet PC, a hybrid tablet, a personal digital assistant (PDA), a mobile telephone, or any electronic device 400 capable of executing instructions (sequential or otherwise) that specify actions to be taken by that machine to detect a user input. Further, while only a single electronic device 400 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The electronic device 400 may further include a display unit 410, where the display unit 410 may include a single component that provides a user-readable display and a protective layer, or another display type. The electronic device 400 may further include an alphanumeric input device 412 (e.g., a keyboard), and a user interface (UI) navigation device 414 (e.g., a mouse). In one embodiment, the display unit 410, input device 412 and UI navigation device 414 are incorporated into an FSR assembly. The electronic device 400 may additionally include a storage device 416 (e.g., a drive unit), a signal generation device 418 (e.g., a speaker), a network interface device 420, and one or more additional sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the electronic device 400. The main memory 404, static memory 406, and the processor 402 may also constitute machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, Near-Field Communications (NFC), Bluetooth, Bluetooth LE, 3G, 4G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here:

Example 1 is a force-sensing apparatus comprising: a display; a first force-sensing substrate disposed on at least a first portion of the display, the first force-sensing substrate to detect a first user force input applied to the display; and a housing disposed on at least a portion of the first force-sensing substrate, the display and the housing exerting a compressive force on the first force-sensing substrate, wherein the first user force input reduces the compressive force on the first force-sensing substrate.

In Example 2, the subject matter of Example 1 optionally includes a backer plate to support the display within the housing.

In Example 3, the subject matter of any one or more of Examples 1-2 optionally include wherein the first force-sensing substrate includes a force-sensing resistor (FSR), the FSR providing a resistance change in response to a compressive force change.

In Example 4, the subject matter of Example 3 optionally includes wherein the FSR provides the resistance change in response to the reduction in the compressive force.

In Example 5, the subject matter of Example 4 optionally includes wherein: the resistance change is compared against a resistance change threshold; and the FSR detects the first user force input when the resistance change exceeds the resistance change threshold.

In Example 6, the subject matter of Example 5 optionally includes wherein the resistance change threshold is static.

In Example 7, the subject matter of any one or more of Examples 5-6 optionally include wherein the resistance change threshold is dynamically adjusted based on a detected steady-state FSR resistance.

In Example 8, the subject matter of any one or more of Examples 4-7 optionally include a resistance-based voltage divider to provide a voltage change in response to the resistance change provided by the FSR.

In Example 9, the subject matter of Example 8 optionally includes wherein: the voltage change is compared against a voltage change threshold; and the FSR detects the first user force input when the voltage change exceeds the voltage change threshold.

In Example 10, the subject matter of Example 9 optionally includes wherein the voltage change threshold is static.

In Example 11, the subject matter of any one or more of Examples 9-10 optionally include wherein the voltage change threshold is dynamically adjusted based on a detected voltage divider steady-state voltage.

In Example 12, the subject matter of any one or more of Examples 4-11 optionally include a seal disposed between the housing and a second portion of the display.

In Example 13, the subject matter of Example 12 optionally includes wherein the seal provides a restorative force to return the display to a steady-state position.

In Example 14, the subject matter of Example 13 optionally includes wherein the restorative force returns the compressive force on the first force-sensing substrate to a steady-state restorative force.

In Example 15, the subject matter of any one or more of Examples 12-14 optionally include wherein the seal reduces environmental ingress.

In Example 16, the subject matter of Example 15 optionally includes wherein the seal provides a water resistance rating of at least 5 ATM.

In Example 17, the subject matter of any one or more of Examples 4-16 optionally include a second force-sensing substrate disposed on at least a third portion of the display to detect a second user force input applied to the display.

In Example 18, the subject matter of Example 17 optionally includes wherein the first user force input and second user force input enable detection of a plurality of simultaneous inputs.

In Example 19, the subject matter of any one or more of Examples 17-18 optionally include wherein the first and second force-sensing substrates enable detection of a user gesture input applied to the display.

In Example 20, the subject matter of Example 19 optionally includes wherein the user gesture input includes at least one of a swipe, pinch, rotate, or flick gesture.

Example 21 is a force-sensing method comprising: receiving a first user force input applied to an electronic device display, the first user force input reducing a compressive force exerted on a first force-sensing substrate by a housing and at least a first portion of the electronic device display; and detecting the first user force input based on a first force-sensing output of the first force-sensing substrate.

In Example 22, the subject matter of Example 21 optionally includes wherein the first force-sensing substrate includes a force-sensing resistor (FSR), the FSR providing a resistance change in response to a compressive force change.

In Example 23, the subject matter of Example 22 optionally includes wherein the FSR provides the resistance change in response to the reduction in the compressive force.

In Example 24, the subject matter of Example 23 optionally includes comparing the resistance change against a resistance change threshold; and detecting the first user force input when the resistance change exceeds the resistance change threshold.

In Example 25, the subject matter of Example 24 optionally includes wherein the resistance change threshold is static.

In Example 26, the subject matter of any one or more of Examples 24-25 optionally include dynamically adjusting the resistance change threshold based on a detected steady-state FSR resistance.

In Example 27, the subject matter of any one or more of Examples 23-26 optionally include providing a voltage change from a resistance-based voltage divider in response to the resistance change provided by the FSR.

In Example 28, the subject matter of Example 27 optionally includes wherein: comparing the voltage change against a voltage change threshold; and detecting the first user force input when the voltage change exceeds the voltage change threshold.

In Example 29, the subject matter of Example 28 optionally includes wherein the voltage change threshold is static.

In Example 30, the subject matter of any one or more of Examples 28-29 optionally include dynamically adjusting the voltage change threshold based on a detected voltage divider steady-state voltage.

In Example 31, the subject matter of any one or more of Examples 23-30 optionally include providing a restorative force to return the display to a steady-state position.

In Example 32, the subject matter of Example 31 optionally includes wherein the restorative force returns the compressive force on the first force-sensing substrate to a steady-state restorative force.

In Example 33, the subject matter of any one or more of Examples 31-32 optionally include wherein the restorative force is provided by a seal disposed between the housing and a second portion of the display.

In Example 34, the subject matter of Example 33 optionally includes wherein the seal reduces environmental ingress.

In Example 35, the subject matter of Example 34 optionally includes wherein the seal provides a water resistance rating of at least 5 ATM.

In Example 36, the subject matter of any one or more of Examples 23-35 optionally include detecting a second user force input based on a second force-sensing output of a second force-sensing substrate, the second force-sensing substrate disposed on at least a third portion of the display.

In Example 37, the subject matter of Example 36 optionally includes detecting a plurality of simultaneous inputs based on the first user force input and second user force input.

In Example 38, the subject matter of any one or more of Examples 36-37 optionally include detecting a user gesture input applied to the display based on the first and second force-sensing substrates.

In Example 39, the subject matter of Example 38 optionally includes wherein the user gesture input includes at least one of a swipe, pinch, rotate, or flick gesture.

Example 40 is at least one machine-readable medium including instructions, which when executed by a computing system, cause the computing system to perform any of the methods of Examples 21-39.

Example 41 is an apparatus comprising means for performing any of the methods of Examples 21-39.

Example 42 is at least one machine-readable storage medium, comprising a plurality of instructions that, responsive to being executed with processor circuitry of a computer-controlled device, cause the computer-controlled device to: receive a first user force input applied to an electronic device display, the first user force input reducing a compressive force exerted on a first force-sensing substrate by a housing and at least a first portion of the electronic device display; and detect the first user force input based on a first force-sensing output of the first force-sensing substrate.

In Example 43, the subject matter of Example 42 optionally includes wherein the first force-sensing substrate includes a force-sensing resistor (FSR), the FSR providing a resistance change in response to a compressive force change.

In Example 44, the subject matter of Example 43 optionally includes wherein the FSR provides the resistance change in response to the reduction in the compressive force.

In Example 45, the subject matter of Example 44 optionally includes the instructions further causing the computer-controlled device to: compare the resistance change against a resistance change threshold; and detect the first user force input when the resistance change exceeds the resistance change threshold.

In Example 46, the subject matter of Example 45 optionally includes wherein the resistance change threshold is static.

In Example 47, the subject matter of any one or more of Examples 45-46 optionally include the instructions further causing the computer-controlled device to dynamically adjust the resistance change threshold based on a detected steady-state FSR resistance.

In Example 48, the subject matter of any one or more of Examples 44-47 optionally include the instructions further causing the computer-controlled device to provide a voltage change from a resistance-based voltage divider in response to the resistance change provided by the FSR.

In Example 49, the subject matter of Example 48 optionally includes wherein: comparing the voltage change against a voltage change threshold; and detecting the first user force input when the voltage change exceeds the voltage change threshold.

In Example 50, the subject matter of Example 49 optionally includes wherein the voltage change threshold is static.

In Example 51, the subject matter of Example 50 optionally includes the instructions further causing the computer-controlled device to dynamically adjust the voltage change threshold based on a detected voltage divider steady-state voltage.

In Example 52, the subject matter of any one or more of Examples 44-51 optionally include the instructions further causing the computer-controlled device to provide a restorative force to return the display to a steady-state position.

In Example 53, the subject matter of Example 52 optionally includes wherein the restorative force returns the compressive force on the first force-sensing substrate to a steady-state restorative force.

In Example 54, the subject matter of any one or more of Examples 52-53 optionally include wherein the restorative force is provided by a seal disposed between the housing and a second portion of the display.

In Example 55, the subject matter of Example 54 optionally includes wherein the seal reduces environmental ingress.

In Example 56, the subject matter of Example 55 optionally includes wherein the seal provides a water resistance rating of at least 5 ATM.

In Example 57, the subject matter of any one or more of Examples 44-56 optionally include the instructions further causing the computer-controlled device to detect a second user force input based on a second force-sensing output of a second force-sensing substrate, the second force-sensing substrate disposed on at least a third portion of the display.

In Example 58, the subject matter of Example 57 optionally includes the instructions further causing the computer-controlled device to detect a plurality of simultaneous inputs based on the first user force input and second user force input.

In Example 59, the subject matter of any one or more of Examples 57-58 optionally include the instructions further causing the computer-controlled device to detect a user gesture input applied to the display based on the first and second force-sensing substrates.

In Example 60, the subject matter of Example 59 optionally includes wherein the user gesture input includes at least one of a swipe, pinch, rotate, or flick gesture.

Example 61 is a force-sensing apparatus comprising: means for receiving a first user force input applied to an electronic device display, the first user force input reducing a compressive force exerted on a first force-sensing substrate by a housing and at least a first portion of the electronic device display; and means for detecting the first user force input based on a first force-sensing output of the first force-sensing substrate.

In Example 62, the subject matter of Example 61 optionally includes wherein the first force-sensing substrate includes a force-sensing resistor (FSR), the FSR providing a resistance change in response to a compressive force change.

In Example 63, the subject matter of Example 62 optionally includes wherein the FSR provides the resistance change in response to the reduction in the compressive force.

In Example 64, the subject matter of Example 63 optionally includes means for comparing the resistance change against a resistance change threshold; and means for detecting the first user force input when the resistance change exceeds the resistance change threshold.

In Example 65, the subject matter of Example 64 optionally includes wherein the resistance change threshold is static.

In Example 66, the subject matter of any one or more of Examples 64-65 optionally include means for dynamically adjusting the resistance change threshold based on a detected steady-state FSR resistance.

In Example 67, the subject matter of any one or more of Examples 63-66 optionally include means for providing a voltage change from a resistance-based voltage divider in response to the resistance change provided by the FSR.

In Example 68, the subject matter of Example 67 optionally includes wherein: comparing the voltage change against a voltage change threshold; and detecting the first user force input when the voltage change exceeds the voltage change threshold.

In Example 69, the subject matter of Example 68 optionally includes wherein the voltage change threshold is static.

In Example 70, the subject matter of Example 69 optionally includes means for dynamically adjusting the voltage change threshold based on a detected voltage divider steady-state voltage.

In Example 71, the subject matter of any one or more of Examples 63-70 optionally include means for providing a restorative force to return the display to a steady-state position.

In Example 72, the subject matter of Example 71 optionally includes wherein the restorative force returns the compressive force on the first force-sensing substrate to a steady-state restorative force.

In Example 73, the subject matter of any one or more of Examples 71-72 optionally include wherein the restorative force is provided by a seal disposed between the housing and a second portion of the display.

In Example 74, the subject matter of Example 73 optionally includes wherein the seal reduces environmental ingress.

In Example 75, the subject matter of Example 74 optionally includes wherein the seal provides a water resistance rating of at least 5 ATM.

In Example 76, the subject matter of any one or more of Examples 63-75 optionally include means for detecting a second user force input based on a second force-sensing output of a second force-sensing substrate, the second force-sensing substrate disposed on at least a third portion of the display.

In Example 77, the subject matter of Example 76 optionally includes means for detecting a plurality of simultaneous inputs based on the first user force input and second user force input.

In Example 78, the subject matter of any one or more of Examples 76-77 optionally include means for detecting a user gesture input applied to the display based on the first and second force-sensing substrates.

In Example 79, the subject matter of Example 78 optionally includes wherein the user gesture input includes at least one of a swipe, pinch, rotate, or flick gesture.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A force-sensing apparatus comprising:
a display;
a first force-sensing substrate disposed on at least a first portion of a user-readable side of the display, the first force-sensing substrate including a force-sensing resistor (FSR) providing a force input resistance change value in response to a compressive force change, the first force-sensing substrate to detect a first user force input applied to the user-readable side of the display; and
a housing disposed on at least a portion of the first force-sensing substrate, the display and the housing exerting a steady state compressive force on the first force-sensing substrate, the first force-sensing substrate further to detect an FSR steady state resistance associated with the steady state compressive force;
wherein:
a resistance change threshold is determined dynamically based on the detected FSR steady state resistance, the resistance change threshold determined to be a resistance value between the FSR steady state resistance and the force input resistance change value;
the first user force input provides the resistance change by reducing the compressive force on the first force-sensing substrate; and
the first force-sensing substrate detects the first user force input based on the resistance change exceeding the resistance change threshold.

2. The force-sensing apparatus of claim 1, further including a backer plate disposed on a second side of the display to support the display within the housing, the second side of the display opposite from the user-readable side of the display.

3. The force-sensing apparatus of claim 1, further including a resistance-based voltage divider to provide a voltage change in response to the resistance change provided by the FSR.

4. The force-sensing apparatus of claim 3, wherein:
the voltage change is compared against a voltage change threshold; and
the FSR detects the first user force input when the voltage change exceeds the voltage change threshold.

5. The force-sensing apparatus of claim 4, wherein the voltage change threshold is dynamically adjusted based on a detected voltage divider steady-state voltage.

6. The force-sensing apparatus of claim 1, further including a seal disposed between the housing and a second portion of the display.

7. The force-sensing apparatus of claim 6, wherein the seal provides a restorative force to return the display to a steady-state position.

8. The force-sensing apparatus of claim 7, wherein the restorative force returns the compressive force on the first force-sensing substrate to a steady-state restorative force.

9. The force-sensing apparatus of claim 1, further including a second force-sensing substrate disposed on at least a third portion of the display to detect a second user force input applied to the display.

10. The force-sensing apparatus of claim 9, wherein the first and second force-sensing substrates enable detection of a user gesture input applied to the display.

11. A force-sensing method comprising:
receiving a first user force input from a force-sensing resistor (FSR) applied to a user-readable side of an electronic device display, the FSR providing a force input resistance change value in response to the first user force input reducing a steady state compressive force exerted on a first force-sensing substrate by a housing and at least a first portion of the user-readable side of the electronic device display, the steady state compressive force having an associated FSR steady state resistance;
detecting the FSR steady state resistance;
determining a resistance change threshold dynamically based on the detected FSR steady state resistance, the resistance change threshold determined to be a resistance value between the FSR steady state resistance and the force input resistance change value; and
detecting the first user force input based on the resistance change exceeding the resistance change threshold.

12. The force-sensing method of claim 11, further including providing a voltage change from a resistance-based voltage divider in response to the resistance change.

13. The force-sensing method of claim 11, further including:
comparing the voltage change against a voltage change threshold; and
detecting the first user force input when the voltage change exceeds the voltage change threshold.

14. At least one non-transitory machine-readable storage medium, comprising a plurality of instructions that, responsive to being executed with processor circuitry of a computer-controlled device, cause the computer-controlled device to:

receive a first user force input from a force-sensing resistor (FSR) applied to a user-readable side of an electronic device display, the FSR providing a force input resistance change value in response to the first user force input reducing a steady state compressive force exerted on a first force-sensing substrate by a housing and at least a first portion of the user-readable side of the electronic device display substrate, the steady state compressive force having an associated FSR steady state resistance;

detect the FSR steady state resistance;

determine a resistance change threshold dynamically based on the detected FSR steady state resistance, the resistance change threshold determined to be a resistance value between the FSR steady state resistance and the force input resistance change value; and detect the first user force input based on the resistance change exceeding the resistance change threshold.

15. The at least one non-transitory machine-readable medium of claim 14, the instructions further causing the computer-controlled device to provide a voltage change from a resistance-based voltage divider in response to the resistance change provided by the FSR.

16. The at least one non-transitory machine-readable medium of claim 15, the instructions further causing the computer-controlled device to:

compare the voltage change against a voltage change threshold; and detect the first user force input when the voltage change exceeds the voltage change threshold.

* * * * *